United States Patent [19]

Pearline et al.

[11] 4,352,826

[45] Oct. 5, 1982

[54] PROCESS FOR PREPARING ACID CHEESE CURD

[75] Inventors: Donald I. Pearline, Olivette; Edgar A. Corbin, Jr., Manchester, both of Mo.; Marvin A. Garner, Greenville, Ill.

[73] Assignee: Mallinckrodt International Corp., St. Louis, Mo.

[21] Appl. No.: 196,752

[22] Filed: Oct. 14, 1980

[51] Int. Cl.³ ............................................ A23C 19/02
[52] U.S. Cl. ........................................ 426/39; 426/40; 426/582
[58] Field of Search .................... 426/36, 39, 40, 582, 426/551

[56] References Cited

U.S. PATENT DOCUMENTS

| 3,170,795 | 2/1965 | Andre | 426/551 |
| 3,359,116 | 12/1967 | Little | 426/582 X |
| 3,620,768 | 11/1971 | Corbin, Jr. | 426/39 |
| 3,882,250 | 5/1975 | Loter et al. | 426/39 |

FOREIGN PATENT DOCUMENTS 1247415  9/1971  United Kingdom.

*Primary Examiner*—David M. Naff
*Attorney, Agent, or Firm*—Bernard, Rothwell & Brown

[57] ABSTRACT

Cheese curd is produced by acidifying milk with an aqueous acidulant mixture containing about 10 to about 60 parts by weight of an acid salt and about 5 to about 40 parts by weight of a free acid. Cottage cheese curd is produced by using an aqueous mixture of sodium bisulfate and sulfuric acid.

10 Claims, No Drawings

PROCESS FOR PREPARING ACID CHEESE CURD

BACKGROUND OF THE INVENTION

1. Field of the Invention

This invention relates to an improved process for manufacture of acid cheese curd in conventional dairy equipment.

2. Description of the Prior Art

Various processes for preparing cheese from chemically acidified milk are known. U.S. Pat. No. 3,620,768 (Corbin) describes the acidification of cold milk at about 32° F. (0° C.) to about 45° F. (7.2° C.) to a pH of about 5.20 to about 4.88 using a free acid such as lactic acid, phosphoric acid, citric acid, acetic acid, maleic acid, sulfuric acid, hydrochloric acid, succinic acid or the like. British Pat. No. 1,247,415 (Battelle) also describes the acidification of cold milk, and moreover states at page 3, lines 3 through 7, that: "It is well known that when milk is acidified at a temperature of about 70° F. (21° C.) to a pH of about 5.20 or below, it coagulates almost instantly into a granular water coagulation, totally unfit for making cheese." This disclosure is supported, generally, in "Principles of Dairy Chemistry" by Robert Jenness and Stuart Patton (John Wiley and Sons, New York, 1959) at page 310, where it is stated: "... the sensitivity of casein to coagulation by heat is enormously increased by decreasing the pH a few tenths of a unit below the normal value for milk."

U.S. Pat. No. 3,882,250 (Loter et al) describes acidification of vigorously agitated milk at about 59° F. (15° C.) to about 86° F. (30° C.) to a pH of about 5.00 by adding 10 to 90 percent aqueous solution of free acid such as lactic acid, phosphoric acid, citric acid, acetic acid, maleic acid, sulfuric acid, hydrochloric acid, succinic acid or the like. An acidogen and proteolytic enzyme are then mixed with the acidified milk of about 59° F. (15° C.) to about 86° F. (30° C.) and the resulting mixture allowed to stand quiescent at the same temperature for about 30 minutes to about 4 hours to form an acid cheese curd suitable for making cottage cheese, baker's cheese, quark cheese, cream cheese and Neufchatel cheese.

U.S. application Ser. No. 053,921—Loter, filed July 2, 1979, now abandoned, and its copending application, U.S. application Ser. No. 223,125, filed Jan. 7, 1981, describe copending acid salts such as sodium bisulfate, ammonium bisulfate, monosodium phosphate and sodium bitartrate are acidifiers for milk in the manufacture of acid cheese curd. The acid salts may be added directly or as an aqueous solution to vigorously agitated milk in the cheesemaking process.

SUMMARY OF THE INVENTION

An effective amount of an aqueous acidulent mixture containing sufficient acid salt and free acid to acidify milk in a cheese curd process to a pH of from about 5.5 to about 4.8 without coagulation is added to vigorously agitated milk at temperatures from about 32° F. to about 95° F. Sufficient free acid is present in the acidulent mixture to reduce the inorganic salt content of the cheese curd and effluent from the process. A 10% to 90% by weight aqueous acidulent mixture containing from about 10 to about 60 parts by weight of an acid salt and from about 5 to about 40 parts by weight of a free acid may be used. From about 0.2 to about 2.0 parts by weight of the acidulent mixture may be added to 100 parts by weight of the milk.

The acidulent mixture may be added to cold milk at temperatures of from about 32° F. to about 55° F. as well as to warm milk at temperatures of from about 59° F. to about 95° F. Useful acidulent mixtures may contain acid salts such as sodium bisulfate, ammonium bisulfate, potassium bisulfate and the like and free acids such as sulfuric acid, hydrochloric acid, phosphoric acid, lactic acid, citric acid, acetic acid, maleic acid, succinic acid and the like.

When necessary, the acidified milk temperature may be adjusted to from about 75° F. to about 95° F. and then maintained at from about 75° F. to about 95° F. during addition of up to about 0.8 parts by weight of acidogen with the preferred amount being about 0.2 to about 0.5 parts by weight of acidogen and from about 0.01 parts to about 0.05 parts by weight of proteolytic enzyme per 100 parts by weight of acidified milk. The acidogen, enzyme and acidified milk mixture is then allowed to remain quiescent at from about 75° F. to about 95° F. for from about 30 minutes to about 4 hours to form an acid cheese curd suitable for making cottage cheese, baker's cheese, quark cheese, cream cheese and Neufchatel cheese. Cottage cheese curd produced by this process is dressed to a curd to dressing ratio of from about 55:45 to about 50:50 by weight.

DESCRIPTION OF THE PREFERRED EMBODIMENTS

Fluid milk used in this invention may be a reconstituted powdered milk or fluid milk product such as fresh skim milk, skim milk having about 1-4 percent by weight or more added NFMS (Grade A, Low Heat, nonfat-milk-solids), whole milk, milk-cream mixtures, half milk and half cream, reconstituted condensed milk and the like. The fluid milk may be produced by reconstitution of powdered milk with water or a fluid milk. It is to be understood that fluid milk products may include medium and high butter-fat milk or cream having as much as 20 percent butterfat as well as milk having butterfat contents of from about 0.01% to about 5% by weight and a total nonfat solids content of from about 8% to about 16% by weight.

Fluid milk is acidified with an aqueous acidulent mixture having an acid salt and an effective amount of free acid sufficient to reduce the inorganic salt content in the curd and effluent from the process by adding the required amount of acidulent mixture to the vigorously agitated milk maintained at about 32° F. to about 95° F. to reduce the milk pH to about 5.5 to about 4.8 without coagulating the milk. The aqueous acidulent mixture may contain from about 10 to 60 parts by weight of an acid salt and from about 5 to about 40 parts by weight of the free acid. From about 0.2 to about 2.0 parts by weight of the acidulent mixture may be added to 100 parts by weight of the milk. Acidification is carried out by adding an aqueous solution containing 10% to 90% by weight of the acidulent mixture to vigorously agitated milk at about 32° F. to about 95° F. to reduce the pH of the milk to about 5.5 to about 4.8 without precipitation of casein or an alteration of the milk that will prevent cheese curd formation.

The acidulent mixture may contain acid salts such as sodium bisulfate, ammonium bisulfate, potassium bisulfate and the like and free acid such as sulfuric acid, hydrochloric acid, phosphoric acid, lactic acid, citric acid, acetic acid, maleic acid, succinic acid and the like.

A solution of the acidulent mixture may be used in the acidification of milk. The solution may be introduced by any conventional metering device. It can be drawn into a pipe recirculating milk using a standard Bernoulli connection, in which case diameter of the connecting tube will determine addition rate of the acidulent mixture. A primary factor in successful acidification of milk is avoidance of casein precipitation (acid coagulation) caused by excessive localized acidity.

A change in any acidification variable can be easily compensated for by adjusting other variables. For example, if the milk temperature is at the low end of the range (slightly above 32° F.), a more concentrated solution of the acidulent mixture can be introduced or the rate of solution addition can be increased, or both of these factors may be varied. All of these factors may be varied within the limits of this invention up to the point where casein begins to precipitate.

Advantages of this invention using an acidulent mixture include savings to the cheesemaker in time and energy. Time and energy can be saved in that milk need not be cooled to about 40° F. for the acidification and then reheated for setting. Further, direct acidification saves considerable time over bacterial culture methods. These time savings allow the commercial cheesemaker greater productivity from his capital intensive facilities.

In addition to time and energy savings, another advantage of this invention, which increases productivity of the cheesemaker, is the increased ability of the cheese curd to take up dressing. Current industry practice is to produce finished cottage cheese having a curd to dressing ratio of from about 67:33 to about 60:40 by weight. With cottage cheese produced by this invention, the cottage cheese curd is dressed to a curd to dressing ratio of from about 55:45 to about 50:50 by weight. Cheese curd dressed to these curd to dressing ratios has a pleasant taste and texture.

This invention has the further advantage that inorganic salt content of cheese curd and effluent from the process are reduced when an acidulent mixture instead of an acid salt is used in the acidification.

After acidification, the milk may be maintained at about the same temperature or warmed to 75° F. to 95° F. and from about 0.2 to about 0.5 parts by weight of at least one acidogen based on 100 parts by weight of acidified milk, and from about 0.01 to about 0.05 parts by weight of aqueous proteolytic enzyme solution based on 100 parts by weight of acidified milk are added to the milk. The resulting mixture is agitated during and after acidogen and enzyme addition until uniform. The acidified milk is then maintained at about the same temperature while quiescent until the acid liberated from the acidogen and the action of the proteolytic enzyme both bring about coagulation of the milk. It takes from about 30 minutes to about 4 hours after addition of the acidogen and proteolytic enzyme for a cuttable cheese curd to form.

An acidogen such as D-glucono-delta-lactone (GDL), the low melting lactide (m.p. 41°-42° C.) of lactic acid, acetic anhydride, heptonolactone (the lactone of glucoheptonic acid) or the like can be used. Preparation of this low melting lactic acid lactide is described in U.S. Pat. No. 2,982,654—Hammond et al, issued May 2, 1961.

The proteolytic enzyme can be commercial rennin, rennet, diluted rennet extract, pepsin-rennin mixture, vegetable-derived enzyme clotting agent or the like. Other enzymes such as pepsin, papain and ficin can be used alone or in combination with rennin, the preferred enzyme. Rennin is obtained from the true stomach or abomasum of suckling calves. Rennet, which is a commercial dried extract containing rennin, can also be used. See Merck Index, page 1056 (Merck & Co., Inc.—1976-9th Ed.). Commercial rennet is a solution of the enzyme rennin, stabilized, and with preservatives added and standardized in strength to a certain coagulating or clotting power. Useful commercial aqueous rennin solutions include Hansen's Rennet Extract and Hansen's Cottage Cheese Coagulator available from Hansen's Laboratory, Inc., Milwaukee, Wis. Another useful enzyme is produced by pure culture fermentation of the organism Mucor Miehei. This enzyme is available commercially in units standardized to rennet extract.

The heated, acidified milk containing acidogen and enzyme is then allowed to remain in a quiescent state at from about 75° F. to about 95° F. with the optimum temperature being from about 80° F. to 90° F. for about 30 minutes to about 4 hours to obtain a cuttable cheese curd.

The cheese curd is then cut and cooked. It can be cut into large (¾-inch, ⅝-inch, ½-inch) or small (⅜-inch or ¼-inch) cubes. The cooking rate in the process of this invention is faster than the cooked rate in the cultured process, that is, about 30 minutes to about 90 minutes compared to about 90 minutes to about 150 minutes. Draining and washing of the cooked curd can be carried out using conventional cheesemaking procedures. Processing of whey containing phosphate salts presents environmental problems not encountered with whey containing sulfate salts.

To produce cottage cheese, the acid cheese curd is processed with the additional steps of:
1. cutting the curd into cubes,
2. expressing the whey from the curd,
3. cooking and stirring the curd from about 30 minutes to about 90 minutes at a temperature of from about 90° F. to about 150° F., and
4. washing and draining the curd.

To prepare baker's cheese, the acid cheese curd is processed with the additional steps of:
1. breaking up the curd,
2. bagging the curd and expressing the whey, and
3. hanging and draining the bagged curd for about 1 hour, to express further whey.

To produce Neufchatel cheese or cream cheese, the acid cheese curd is processed with the additional steps of:
1. cutting the curd,
2. cooking and stirring the curd until the temperature reaches about 130° F. and then continuing cooking for about 15 additional minutes,
3. cooling the curd to about 59° F.,
4. draining the curd overnight at about 37° F.–39° F. to obtain a dry, soft curd,
5. mixing the dry, soft curd with sufficient lactic acid to reduce the curd pH to 4.60, and
6. blending the curd into a smooth homogeneous cheese mass. The original milk should have about 10.5% to about 11.5% fat content for cream cheese and about 5% to about 6% fat content for Neufchatel cheese.

For a fuller understanding of the nature of this invention, reference may be made to the following examples. These examples are given merely to illustrate the invention and are not to be construed in a limiting sense. All parts, proportions and quantities are by weight unless otherwise indicated. The terms g, ml, °C, °F. and NFMS are used to indicate grams, milliliters, degrees Centigrade, degrees Fahrenheit and non-fat-milk-solids respectively in these examples.

EXAMPLE I

Forty gallons of skim milk at 86° F. was acidified to a pH of 5.03–5.05 by injecting into the flowing milk stream, an acidulent mixture containing 85 parts by weight of a 33% solution of food-grade sodium bisulfate and 15 parts by weight of concentrated (97% by weight) food-grade sulfuric acid. (Note: This mixture may also be described as being 28.05% by weight pure sodium bisulfate and 14.55% by weight pure $H_2SO_4$). The acid-acid salt mixture and skim milk were intimately mixed by passing through an in-line static mixer located immediately after the point of acid injection. Acidified skim milk was then delivered into a warm (90° F.) cheese vat where it was found to be of normal viscosity, normal appearance and entirely free of any precipitated specks of casein. Temperature of the milk was 88° F. and its pH had equilibrated to 5.20.

The acidified skim milk was then set to a cottage cheese curd by adding a slurry of 725.25 g of acidogen (D-glucono-delta-lactone), and 35.5 ml of commercial cottage cheese coagulator (rennet) in 2 qts of water, and by stirring these into the milk for 2 minutes to insure homogeneity. Stirring was stopped and the mixture allowed to set quiescently for 1.5 hours at 88° F., during which time a smooth, shiny, cuttable cottage cheese curd formed. The uncut curd had a measurable curd tension of 26 g and a pH of 4.78. Using wire cheese knives, the curd was cut into ¼" cubes; the cut cubes were allowed to "heal" for about 15 minutes; 40 ml of 75% by weight phosphoric acid was distributed into the whey that had exuded to lower the pH for cooking below 4.5; and gentle hand-stirring of the curd was started. The curd was cooked in the normal manner to a temperature of 140° F.; the whey was drained, and the curd washed 3 times with progressively colder water. The washed and drained curd was normal in all respects, and weighed 59.5 lbs, representing a dry curd yield of 17.2%. The drained curd was "creamed" by adding 45 parts by weight of prepared cream dressing for each 55 parts by weight of dry curd. The finished creamed cottage cheese was acceptable, and taste-panel evaluation showed it to be comparable to commercial creamed cottage cheese.

EXAMPLE II

Forty gallons of skim milk was heated to 85° F. and pumped to a jacketed cheese vat. An acidulent mixture containing 31.01 parts by weight of sulfuric acid and 22.78 parts by weight of sodium bisulfate per 100 parts by weight was injected into the flowing milk stream at the up-stream end of an in-line static mixing device by means of an adjustable pump. The metering pump was adjusted to deliver about 8.13 ml of acidifying mixture for each and every gallon of milk pumped into the cheese vat. Acidified milk in the vat had a pH of 5.218 at about 85° F., and had not coagulated. A slurry was prepared by adding 635.5 g of acidogen (D-glucono-delta-lactone) and 35.5 ml coagulator (rennet) to about 2 quarts of water. This slurry was added to the vat of acidified milk and gently mixed to obtain a homogeneous mixture. Two small samples of the mixture were taken and held for gel tests at 85 minutes. The coagulum was allowed to develop for 90 minutes before being cut with small curd cheese knives. The gel test at 85 minutes showed a gel strength of about 14 g and the cut was acceptable.

The cut curd was allowed to heal for 15 minutes and 35.5 ml of phosphoric acid was added to lower the pH for cooking. Curd pH immediately before cutting was 4.93 and whey pH after cooking was started was 4.63 at 100° F. The cheese curds were cooked with gentle stirring early until a temperature of 140° F. was attained. The cut curds were washed in three successively cooler washes of city water at temperatures of about 90° F., about 60° F. and about 40° F. The washed curds were drained and handled in the usual manner for cottage cheese curd. A total weight of 54.5 pounds of curds was obtained. The total solids of the curds was at least 18.66%, giving a yield corrected to 20% total solids basis of 14.74%. The cottage cheese was dressed to a curd to dressing ratio of 55:45 and the finished product was acceptable.

EXAMPLE III

A 960 g aliquot of skim milk having a pH of 6.75 was heated in a beaker to 88° F. Using good agitation, 14.3 ml of an acidulent mixture containing 20.68 parts by weight of sodium bisulfate and 7.88 parts by weight of phosphoric acid in a total of 100 parts by weight with balance being water was added to the milk to adjust the pH to 5.11 without coagulation of milk protein. Then, 3.89 g of powdered acidogen (D-glucono-delta-lactone) was added and mixed for one minute. Next, 0.22 ml of coagulator (rennet) in about 5 ml of water was added to the mixture of acidified milk and acidogen and mixed for one minute. Temperature of the milk was maintained at 88° F.–90° F. for 90 minutes at which time the coagulum was cut and cooked. Gel tests were performed and showed a gel strength of 8 g and a whey pH after cutting of 4.66. The cut curd was cooked to 140° F., washed with three water washes at temperatures of about 90° F., then about 60° F. and finally about 40° F. The curd was drained on a screen for thirty minutes. A 90 g sample of curd was then dressed with 90 g of dressing for a 50:50 curd to dressing ratio. The finished cottage cheese was soft, but acceptable.

EXAMPLE IV

Forty gallons of skim milk at 86° F. was pumped to a cheese vat through a in-line mixer. An acidulent mixture was introduced so that each and every gallon of milk had added to and mixed with it about 15.18 ml of acidulent. The acidulent mixture contained 25.23 parts by weight of sodium bisulfate and 23.81 parts by weight sulfuric acid per 100 parts by weight with the balance being water. After acidification, milk in the filled vat had a pH of 5.22 and a temperature of 86.5° F. To the acidified milk was added a slurry containing 725.75 g of acidogen (D-glucono-delta-lactone) and 35.5 ml of coagulator (rennet) in about 2 quarts of cold water. The slurry was stirred gently into the acidified milk to obtain a homogeneous mixture and then allowed to set undisturbed for 90 minutes.

At the end of 90 minutes, pH of the curd was about 4.80 and the curd was cut. After 15 minutes of healing and addition of 35.5 ml of phosphoric acid to further reduce the pH to about 4.5, the cut curd was cooked to a temperature of 140° F. The cheese curd was washed with three washes of city water at temperatures of 90° F., 60° F. and 40° F. respectively.

A total of 63.5 pounds of curd was removed from the cheese vat representing a yield corrected to 20% total solids basis of 16.38%.

Samples of the curd were dressed with a cottage cheese dressing at ratios up to and including 50:50 curd to dressing. Samples of the finished cottage cheese were acceptable commercial products.

EXAMPLE V

To one gallon low fat (½%) milk at 36° F. having a pH of 6.6, the following quantities of an acidulent mixture having a specific gravity of 1.287 at 40° F. and containing 90% by weight ($NH_4HSO_4$ 40% solution) and 10% by weight concentrated $H_2SO_4$ (96.4% solution) were added to obtain acidified milk having the pHs shown below:

| Acidulent (ml) | pH |
|---|---|
| 10 | 5.6 |
| 5 | 5.3 |
| 5 | 5.05 |
| 5 | 4.75 |

After addition of acidulent mixture, the milk was clean and did not contain any specks. Warmed milk slowly with stirring. At 60° F., pH of milk was 4.9 and at 88° F., pH of milk was 5.05. After warming, milk was clean and clear on a spatula.

At 87° F., added 14 g acidogen (D-glucono-delta-lactone) as a powder to milk and stirred one minute. Added 0.9 ml coagulator (rennet) in 3 ml water and stirred one minute. The pH of milk was 5.01. Milk was clean and clear. Allowed milk to set in 90° F. water bath. At end of one hour, a cuttable curd formed, which cut clean. After 1½ hours, cut curd to obtain a smooth, clean cut curd. Curd tension was 12 g and whey pH was 4.62. Cooked curd slowly to 100° F. Whey pH was 4.65. Cooked curd to 130° F. to obtain very clear whey having a final pH of 4.4. Curd contained 3 ml of fines sediment. Washed curd three times and drained. Curd weight was 752 g representing yield of 19.15%. Dressed 752 g curd with 615 g of dressing to obtain a curd:dressing ratio of 55:45. Cottage cheese was slightly wet when packaged and refrigerated. Taste was clean and texture was slightly soft.

EXAMPLE VI

To one gallon low fat (½% fat) milk at 36° F. having a pH of 6.6, added 20 ml of an acidulent mixture containing 90 parts by weight of 50% $NaHSO_4.H_2O$ solution and 10 parts by weight of concentrated $H_2SO_4$ (96.4%) active to reduce pH of the milk to 4.9. The milk was clean and clear on a spatula. The following quantities of acidulent was added to obtain the pHs shown below:

| Acidulent (ml) | pH | Remarks |
|---|---|---|
| 2 | 4.72 | Stirred 5 minutes |
| 0.5 | 4.75 | |
| 0.5 | 4.70 | |

Warmed acidified milk slowly with stirring. At 70° F., milk pH was 4.88 and clear. At 88° F., milk pH was 4.95.

Added 9 g powdered acidogen (D-glucono-delta-lactone). Stirred one minute and added 0.6 ml coagulator (rennet) in 3 ml $H_2O$. Stirred one minute, milk pH was 4.95. Allowed milk to set undisturbed at 89° F. for 70 minutes. Soft set. Cut curd. Curd cut satisfactorily but slightly soft. Whey pH was 4.70. Allowed cut curds to set. Cooked curds slowly. Whey pH at 100° F. was 4.70.

Added 1 ml of phosphoric acid. Whey pH was 4.4. Cooked curds to 134° F. Allowed cut curds to stand in hot whey 1½ hours. Final whey pH was 4.4. Whey fines were 7.5 ml. Drained whey. Washed cut, cooked curds 3 times. Drained curds. Curd weight was 888 g (slightly wet) representing a curd yield of 22.6%.

EXAMPLE VII

A total of 900 g of skim milk at 85° F. with pH of 6.75 was acidified with 6.67 g of an acidulent mixture to a pH of 5.22 without coagulation by introducing the acidulent mixture into vigorously agitated milk. The acidulent mixture contained 25.85 parts by weight of ammonium sulfate, 16.67 parts by weight of sodium bisulfate, 18.9 parts by weight of sulfuric acid and sufficient water to total 100 parts by weight.

After acidification, 3.84 g of powdered acidogen (D-glucono-delta-lactone) was added to the acidified milk and mixed one minute. Then, 0.18 ml of coagulator (rennet) was added to the acidified milk and mixed for one minute. The acidified milk, acidogen and coagulator mixture was allowed to stand undisturbed at 85° F. for 95 minutes. A coagulum formed, was cut with a spatula and cooked to 140° F. Whey pH after cook-out was 4.45, and 148 g of curd was recovered. The curd was dressed with an equal weight of half and half dressing and salted to give 1% salt in the finished product. The finished product had very soft curd structure but had acceptable taste.

EXAMPLE VIII

An acidulent mixture was prepared by adding 32.27 parts by weight of sodium sulfate, 22.29 parts by weight of sulfuric acid and balance water to obtain a total of 100 parts by weight of the mixture. A total of 11.41 g of this acidulent mixture was added to 1420.3 g of rapidly agitated skim milk at 87° F. The milk, before addition of acidulent, had a pH of 6.75 and was acidified to a pH of 5.2 without coagulation. A total of 6.1 g of acidogen (D-glucono-delta-lactone) was added as a powder to the acidified milk and mixed for one minute. Next, 0.28 ml of coagulator (rennet) was added and mixed for one minute. The acidified milk, acidogen and coagulator mixture was then allowed to set at 87°-90° F. for two hours. After two hours, the pH of the coagulum was 4.8 and the cuttable curd thus produced was cut with a spatula. The cut curd was heated slowly to about 100° F. and then cooked out to 140° F. The pH of the whey after cookout was pH 4.52. The curd was partially drained and given three washes in successively cooler waters to temperatures of 90° F., 60° F. and then below 40° F. After washing and draining, 262 g of curd was obtained. Curd was slightly weak but acceptable in taste. The curd was dressed with half and half dressing and salted. The finished product next day was soft and had an acceptable taste.

EXAMPLE IX

An acidulent mixture was prepared using 22.15 parts by weight of ammonium sulfate, 28.5 parts by weight of sodium bisulfate, 16.2 parts by weight of sulfuric acid and sufficient water to obtain 100 parts by weight of mixture. A total of 10.7 g of the acidulent mixture was added to 1501.2 g of vigorously agitated skim milk at 86° F. The neutral milk had a pH of 6.75. Addition of the acidulent mixture lowered the pH to 5.2. A total of 6.4 g acidogen (D-glucono-delta-lactone) was added and mixed for one minute. This was followed by addition of 0.47 ml of coagulator (rennet) which was mixed for one minute. The mixture was allowed to set for 1.5 hours and its pH fell to 4.78. A cuttable curd was produced and cut with a spatula.

EXAMPLE X

An acidulent mixture was prepared using 31.99 parts by weight of ammonium bisulfate and 15 parts by weight of phosphoric acid with sufficient water to total 100 parts by weight. A total of 11.5 g of the acidulent mixture was added to 1333.1 g of vigorously agitated skim milk at a pH of 6.75 and a temperature of 88° F. The acidulent mixture reduced pH of the milk to 5.2. Then, 5.69 g of acidogen (D-glucono-delta-lactone) were added to the acidified milk and mixed for one minute and 0.27 ml of coagulator (rennet) was added and mixed for one minute. The acidified milk, acidogen and coagulator mixture was allowed to set at 88° F.–90° F. for 90 minutes, at which time its pH was 4.82 and a coagulum had formed. The coagulum was cut and cooked to 150° F. The pH of the whey after cookout was 4.51 and 229 g of curd was recovered.

EXAMPLE XI

Forty gallons of skim milk at 90° F. were pumped to a cheese vat. While being pumped, each and every gallon was acidified by means of an "in-line" injection/static mixer/meter system. The neutral milk, pH of 6.7, was acidified with an acidulent mixture to a vat pH of 5.26. The acidulent mixture contained 28.33 parts by weight of sodium bisulfate, 14.7 parts by weight of sulfuric acid and sufficient water to total 100 parts by weight. The acidulent mixture was added at the rate of 0.68 parts by weight per 100 parts by weight of milk. After the acidified milk in the vat was well mixed, an aqueous slurry of the acidogen (D-glucono-delta-lactone) was added and well mixed. The acidogen (D-glucono-delta-lactone) was added at a concentration of 0.40 parts by weight to 100 parts by weight of acidified milk. The aqueous slurry of acidogen (D-glucono-delta-lactone) also contained an enzyme coagulator (rennet) at a concentration of about 0.025 parts by weight in 100 parts by weight of acidified milk. The mixture of acidified milk, acidogen and coagulator was allowed to set for 1.5 hours before cutting. A gel test before cutting showed a satisfactory reading of 12 g using a Marine Colloids Co. gel tester. The coagulum pH just prior to cutting was 4.84.

After the cheese was cut using small curd wire cheese knives and then allowed to expel whey for about fifteen minutes, 0.04 parts by weight of phosphoric acid per 100 parts by weight of curd and whey was added to lower the pH. The cut cheese curd was cooked to 140° F. with gentle agitation, then washed and drained. It was washed with three successively cooler water washes having temperatures of 90° F., 60° F. and 40° F. respectively. A yield of 55.5 pounds of curd having total solids of 18.44% was obtained. This yield represented a yield corrected to 20% total solids of 14.83%. The curd was dressed at a curd to dressing ratio of 52.5:47.5 by weight. The finished cottage cheese was tasted and found to be excellent in quality.

EXAMPLE XII

A series of vats of cottage cheese curd was produced using an acidulent mixture which contained 28.33 parts by weight of sodium bisulfate, 14.7 parts by weight of sulfuric acid and sufficient water to total 100 parts by weight. The acidulent mixture was added at the rate of about 0.51 parts by weight per 100 parts by weight of milk.

Free acid in the acidulent mixture was an effective amount to reduce the sodium content of the resultant curd when compared to cheese curd produced with acidulents which were acid salts without free acid. Laboratory analysis of the cheese curds showed an average sodium content of 0.01198% for this mixed acid—acid salt system as compared to 0.0267% for the acid salt acidulent system. Cheese curd produced by the mixed acid—acid salt system was acceptable and the expected yield was obtained.

Prior to the present invention, ability of cheese curd to take dressing was increased by using an acid salt instead of a free acid. This invention showed that acidulent mixtures of an acid salt and a free acid also increase ability of the cheese curd to take dressing as well as reduce the salt content of the curd.

Further, it was well established that the use of a free acid would cause irreversible protein damage at pH-temperature combinations which were possible with acid salt systems. This invention teaches that certain combinations of free acids and acid salts can be made which unexpectedly work to protect milk proteins at pH-temperatures where a free acid alone in the same amount would cause such damage to the milk protein system.

Additionally, these discovered combinations can be produced without the added expense of deionizing and demineralizing the process water as is needed when using an acid salt solution and their use increases the shelf life of the finished curd.

The increased resistance to the bacterial deterioration may be due to shorter time of vulnerability which is possible by using this invention.

While the invention has been described with reference to certain specific embodiments thereof, it is understood that it is not to be so limited since alterations and changes may be made therein which are within the full and intended scope of the appended claims.

What is claimed is:
1. An acid curd making process comprising:
  a. acidifying milk under vigorous agitation at about 32° F. to about 95° F. with a sufficient amount of an aqueous acidulent mixture of an acid salt and a free acid per 100 parts by weight of milk to obtain an acidified milk having a pH of from about 4.8 to about 5.5 without coagulation wherein about 10 to about 60 parts by weight of the acid salt and from about 5 to about 40 parts by weight of the free acid are present in the aqueous acidulent mixture; then
  b. adjusting the acidified milk to a temperature of from about 75° F. to about 95° F.; then
  c. maintaining the acidified milk at a temperature of from about 75° F. to about 95° F. and adding about 0.2 to about 0.8 parts by weight of an acidogen and from about 0.01 parts to about 0.05 parts by weight of proteolytic enzyme per 100 parts by weight of the acidified milk; and thereafter
  d. allowing the acidified milk from (C) to remain quiescent at a temperature of from about 75° F. to about 95° F. for from about 30 minutes to about 4 hours to form an acid cheese curd suitable for making cottage cheese, baker's cheese, quark cheese, cream cheese and Neufchatel cheese.

2. The process of claim 1 wherein the acidulent mixture in step A is a 10% to 90% aqueous acidulent mixture.

3. The process of claim 1 wherein the acid salt in step A is selected from the group consisting of sodium bisulfate, ammonium bisulfate and potassium bisulfate and the free acid in step A is selected from the group consisting of sulfuric acid, hydrochloric acid, phosphoric acid, lactic acid, citric acid, acetic acid, maleic acid and succinic acid.

4. The process of claim 3 wherein the acid salt is sodium bisulfate and the acid is sulfuric acid.

5. The process of claim 3 wherein the acid salt is ammonium bisulfate and the acid is sulfuric acid.

6. The process of claim 3 wherein the acid salt is sodium bisulfate and the acid is phosphoric acid.

7. The process of claim 3 wherein the acid salt is sodium bisulfate and ammonium bisulfate and the acid is sulfuric acid.

8. The process according to claim 1 with the additional steps of:
   E. cutting the acid cheese curd into cubes,
   F. expressing whey from the curd,
   G. cooking and stirring the curd for from about 30 minutes to about 90 minutes at a temperature of from about 100° F. to about 150° F., and
   H. washing and draining the curd to obtain a cottage cheese curd.

9. The process according to claim 1 with the additional steps of:
   E. breaking up the acid cheese curd, then
   F. bagging the broken curd and expressing whey therefrom, and thereafter
   G. hanging and draining the bagged curd for about 1 hour to help express additional whey, to obtain a baker's cheese curd.

10. The process according to claim 1 with the additional steps of:
   E. cutting the acid cheese curd into cubes,
   F. cooking and stirring the curd until whey temperature reaches about 130° F. and then continuing cooking for about 15 minutes additionally,
   G. cooling the curd to about 59° F.,
   H. draining the curd overnight at about 45° F. to obtain a dry, soft curd, and
   I. mixing the dry, soft curd with sufficient lactic acid to reduce pH of the curd to 4.6 and blending the curd into a smooth homogeneous cheese mass, with the proviso that the milk of step (A) is part milk and part cream so as to have a fat content of
   (a) from about 5 to about 6 percent for the production of Neufchatel cheese, or
   (b) from about 10.5 to about 11.5 percent for the production of cream cheese.

* * * * *